United States Patent
Shah et al.

(10) Patent No.: US 7,634,650 B1
(45) Date of Patent: Dec. 15, 2009

(54) VIRTUALIZED SHARED SECURITY ENGINE AND CREATION OF A PROTECTED ZONE

(75) Inventors: Shreyas Shah, San Jose, CA (US); Naveed Cochinwala, San Jose, CA (US); Greg Lockwood, Redwood City, CA (US); Subramaniam Vinod, San Jose, CA (US)

(73) Assignee: Xsigo Systems, Mountain View, CA (US)

( * ) Notice: Subject to any disclaimer, the term of this patent is extended or adjusted under 35 U.S.C. 154(b) by 935 days.

(21) Appl. No.: 11/184,306

(22) Filed: Jul. 18, 2005

Related U.S. Application Data

(60) Provisional application No. 60/590,450, filed on Jul. 22, 2004.

(51) Int. Cl.
*G06F 9/00* (2006.01)
(52) U.S. Cl. ............... 713/150; 713/161; 713/168; 713/169; 713/171
(58) Field of Classification Search ......... 713/150, 713/161, 168, 169, 171
See application file for complete search history.

(56) References Cited

OTHER PUBLICATIONS

Figueiredo et al, "Resource Virtualization Renaissance", May 2005, IEEE Computer Society, pp. 28-31.
Ajay V. Bhatt, "Creating a Third Generation I/O Interconnect", Intel® Developer Network for PCI Express* Architecture, www.express-lane.org, pp. 1-11.

*Primary Examiner*—Thomas Peeso
(74) *Attorney, Agent, or Firm*—Weaver Austin Villeneuve & Sampson LLP

(57) ABSTRACT

Methods and apparatus are provided for creating a secure zone having multiple servers connected to a resource virtualization switch through I/O bus interfaces, such as PCI Express or PCI-AS. Servers connected to the resource virtualization switch using I/O bus interfaces share access to one or more virtualized cryptographic accelerators associated with the resource virtualization switch. Applications on a server or system images running on hypervisor inside server can use cryptographic accelerators associated with the resource virtualization switch as though the resources were included in the server itself. Connections between multiple servers and the resource virtualization switch are secure non-broadcast connections. Data provided to a resource virtualization switch can be cryptographically processed using one or more shared and virtualized cryptographic accelerators.

34 Claims, 10 Drawing Sheets

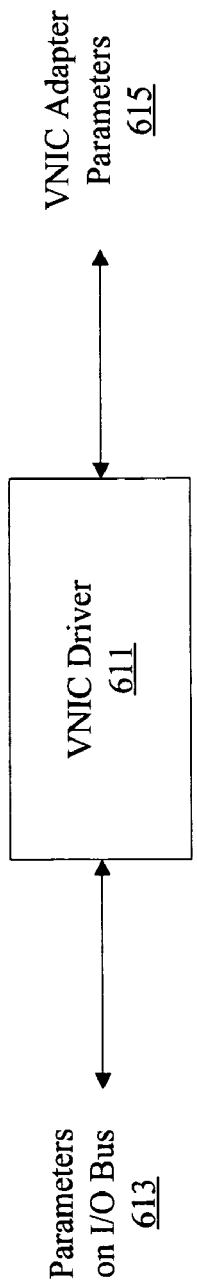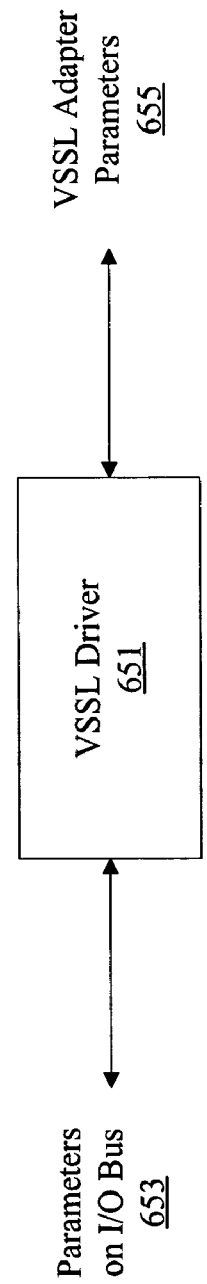
Figure 6A
Figure 6B

VIRTUALIZED SHARED SECURITY ENGINE AND CREATION OF A PROTECTED ZONE

CROSS-REFERENCE TO RELATED APPLICATIONS

This application claims priority from U.S. Provisional Patent Application No. 60/590,450 titled METHODS AND APPARATUS FOR RESOURCE VIRTUALIZATION, filed on Jul. 22, 2004 by Shreyas Shah, Subramanian Vinod, R. K. Anand, and Ashok Krishnamurthi, the entirety of which is incorporated by reference for all purposes.

BACKGROUND OF THE INVENTION

1. Field of the Invention

The present invention relates to security. In one example, the present invention relates to methods and apparatus for efficiently creating a secure zone including multiple servers connected to a resource virtualization switch through I/O bus interfaces, such as PCI Express or PCI Advanced Switching (AS).

2. Description of Related Art

Conventional servers use a variety of cryptographic algorithms to secure traffic transmitted onto a network such as an Ethernet/IP network. In some instances, cryptographic algorithms are performed by a processor having a conventional instruction set. Using software based cryptographic algorithms to perform key generation, bulk encryption, and bulk decryption is an effective but inefficient mechanism for securing traffic, particularly if a large amount of data is cryptographically processed. Cryptographic processing can be computationally expensive, can place a large load on server processors, and can hinder server performance.

Specialized cryptographic accelerators allow cryptographic processing to be offloaded from processors onto special purpose cards or devices. Calls are made to cryptographic accelerators to perform processing intensive operations such as key generation and bulk encryption/decryption. Processors are freed to perform other server operations. However, providing specialized cryptographic accelerators in individual servers is expensive. Consequently, cryptographic accelerators are often only provided in network devices such as edge routers. Data is transmitted in plaintext over local area networks to edge routers. In some instances, edge routers decrypt the data, process it, encrypt again before sending to servers. This mechanism is not efficient since each server CPU has to decrypt the incoming data or encrypt the outgoing data. Data is cryptographically processed at an edge router and data is transmitted in ciphertext between edge routers and other core routers in an IP network. Data is again cryptographically processed when it reaches an edge router associated with the destination.

However, many servers are connected to edge routers through Ethernet based local area networks. Ethernet is a broadcast medium. Any server connected to an Ethernet based network has easy access to transmissions associated with other servers. In some instances, an unscrupulous user with access to one server can obtain plaintext data transmissions associated with all other servers on a local area network.

Consequently, it is desirable to provide techniques and mechanisms for further securing data transmissions associated with multiple servers connected to an external network.

SUMMARY OF THE INVENTION

Methods and apparatus are provided for creating a secure zone having multiple servers connected to a resource virtualization switch through I/O bus interfaces, such as PCI Express or PCI-AS. Servers connected to the resource virtualization switch using I/O bus interfaces share access to one or more virtualized cryptographic accelerators associated with the resource virtualization switch. Entities such as applications on a server or system images running on a hypervisor inside server can use cryptographic accelerators associated with the resource virtualization switch as though the resources were included in the server itself. Connections between multiple servers and the resource virtualization switch are secure non-broadcast connections. Data provided to a resource virtualization switch can be cryptographically processed using one or more shared and virtualized cryptographic accelerators.

In one embodiment, a system is provided. The system includes a first server, a second server, and a switch. The first server includes a first processor and a first memory address space. The second server includes a second processor and a second memory address space. The switch includes a cryptographic accelerator. The switch is connected to the first server and the second server using an input/output bus interface. The first server accesses the cryptographic accelerator by using a first virtual device driver and the second server accesses the cryptographic accelerator by using a second virtual device driver.

In another embodiment, a resource virtualization switch is provided. The resource virtualization switch includes an I/O bus interface, hardware resources, and virtualization logic. The I/O bus interface is connected to the servers. Each of the servers includes a processor and memory. The hardware resources include cryptographic accelerator resources. Virtualization logic includes virtualized Direct Memory Access (DMA) engines configured to obtain data from the servers and provide the data to selected hardware resources.

In yet another embodiment, a technique for encrypting data is provided. A transmit descriptor queue is polled for a transmit descriptor associated with a first server virtual cryptographic accelerator device driver. The transmit descriptor corresponds to unencrypted data from a first server. Unencrypted data is read by using information from the transmit descriptor after arbitrating for access to an I/O bus. Unencrypted data is provided to a cryptographic accelerator included in a resource virtualization switch. Encrypted data is obtained from the cryptographic accelerator. A receive descriptor is inserted onto a receive descriptor queue associated with the first server virtual cryptographic accelerator device driver, the receive descriptor corresponding to encrypted data requested by the first server.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIGS. 6A-6B are a diagrammatic representation depicting a VNIC and a VSSL driver.

DETAILED DESCRIPTION OF SPECIFIC EMBODIMENTS

Figure 1:
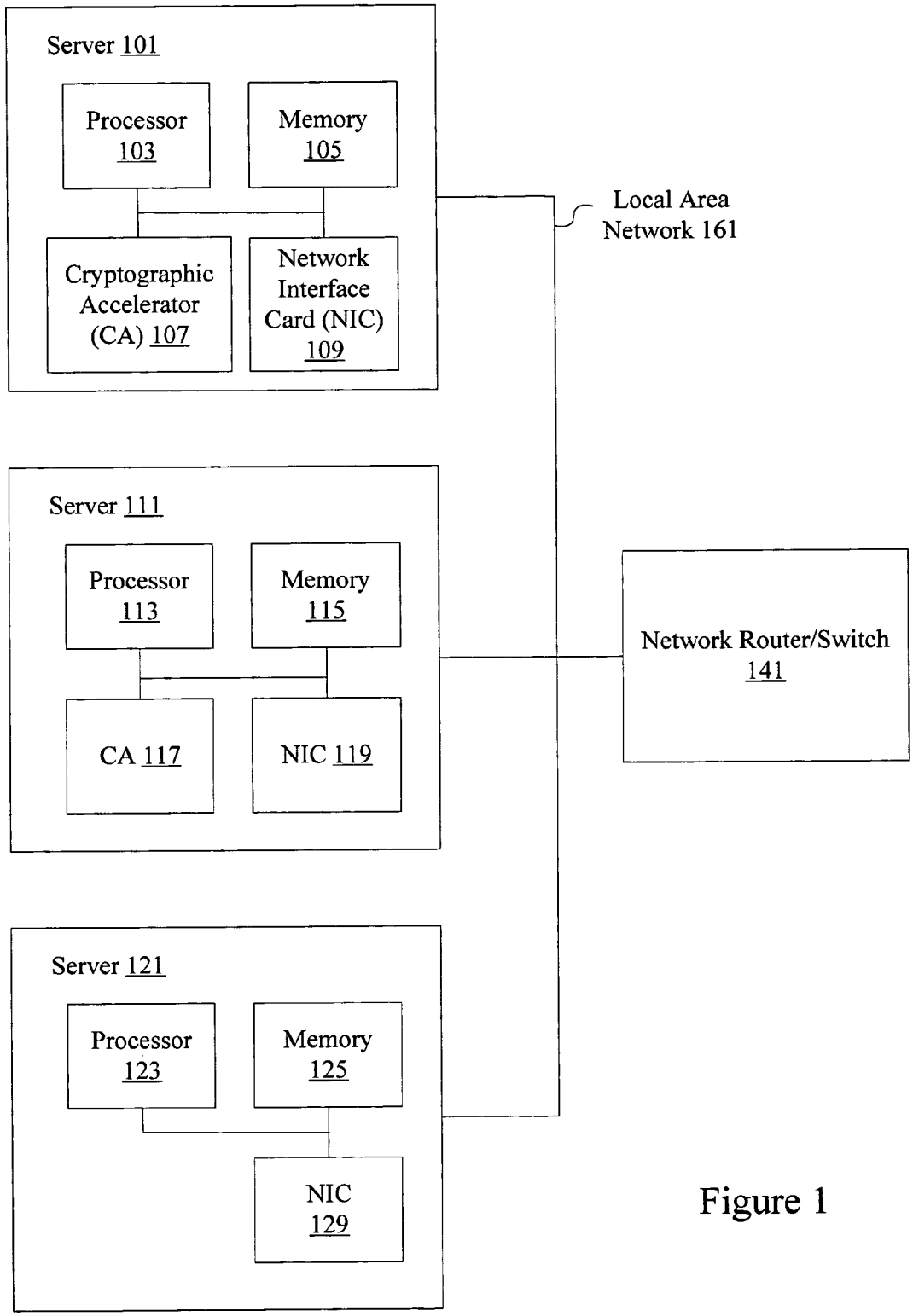
FIG. 1 is a diagrammatic representation showing cryptographic accelerators included in individual servers.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Peripheral Control Interface (PCI) Express, I/O bus, and Ethernet/Internet Protocol (IP) networks. However, it should be noted that the techniques of the present invention can be applied to a variety of different standards and variations to PCI Express, PCI-AS, and IP networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A variety of cryptographic algorithms allow secure transmission of data between computer systems. However, many cryptographic algorithms are processing and resource intensive. Operations such as complex public key computation and bulk encryption burden host processors and can lead to degradation in system performance.

Cryptographic accelerators have been developed to offload computationally expensive cryptographic algorithms from a host processor onto stand alone devices or accelerator cards and chips. In some instances, individual servers are equipped with general purpose cryptographic accelerators to handle encryption standards such as the Data Encryption Standard (DES), the triple Data Encryption Standard (3DES), RC4, or the Advanced Encryption Standard (AES) as well as authentication algorithms such as Message Digest #5 (MD5) and the Secure Hash Algorithm (SHA). In other examples, individual servers are equipped with specialized Secure Socket Layer (SSL) accelerators. SSL accelerators are specifically designed to perform complex public key operations associated with key exchanges. A server burdened by simultaneous SSL sessions from individual clients would be able to handle a much larger number of simultaneous sessions by using an SSL accelerator.

However, providing cryptographic accelerators for individual computer systems is expensive. Not only are individual cards or stand alone devices expensive, but maintaining and providing fault tolerance for the cryptographic accelerators is expensive as well. Consequently, cryptographic accelerators are often only provided on network devices such as edge/access or core switches/routers. By providing cryptographic accelerators at edge/access or core switches/routers, ciphertext is used for communication between network entities such as edge switches/routers and core switches/routers. External network traffic would be as secure as the cryptographic algorithms protecting it. However, individual servers connected to network devices over a local area network would continue transmitting over the local area network in plaintext or network devices encrypt again. Network devices are typically connected to an Ethernet based local area network. Ethernet is a broadcast medium, and all servers connected to the local are network can be configured to snoop broadcast packets. An unscrupulous third party even without a protocol analyzer would be able to obtain plaintext data transmitted to and from the individual servers on a local area network.

Consequently, the techniques and mechanisms of the present invention provide security not only for transmissions between edge routers and core routers but provide security for transmissions between servers and the external network. That is, transmissions between individual servers and between servers and the resource virtualization switch are included in a secure zone. According to various embodiments, the techniques and mechanisms of the present invention allow for virtualization of cryptographic accelerators and server access to the cryptographic accelerators through a non broadcast medium. According to various embodiments, cryptographic accelerator resources are offloaded onto a resource virtualization switch. The resource virtualization switch is coupled to multiple servers or computer systems using an I/O bus such as PCI Express or PCI Advanced Switching (PCI-AS). The servers can be configured to share access to cryptographic accelerator resources. Communication over external networks remains secure. Communication between local servers can also be secured. Transmissions over that I/O bus or I/O fabric can no longer be easily accessed on a non broadcast medium. Connecting multiple servers to a switch having offloaded cryptographic accelerator resources creates a secure zone.

According to various embodiments, each server no longer includes a cryptographic accelerator and an associated device driver, but instead has access to an offloaded cryptographic accelerator by using a virtual cryptographic accelerator device driver in conjunction with virtual hardware engine that provides the hardware virtualization of cryptographic accelerator. The virtual device driver is configured to allow access to the cryptographic accelerator included on the resource virtualization switch. In some embodiments, the server processor has access to the offloaded cryptographic accelerator as though the cryptographic accelerator were included in the server and directly accessible over the I/O bus or fabric.

Access to resources such as the cryptographic accelerators remains at the I/O bus or fabric level. Any mechanism allowing interconnection of components in a computer system is referred to herein as a I/O bus, fabric, or interface. Examples of buses include PCI, PCI Express, PCI-AS (PCI Advanced Switch), Vesa Local Bus (VLB), PCMCIA, and AGP. For example, master components (e.g. processors) initiate transactions such as read and write transactions over buses with slave components (e.g. memory) that respond to the read and write requests. Buses are typically associated with a memory space to allow for use of the read and write transactions. Any device having one or more processors that are able to access a shared memory address space is referred to herein as a server, computer, or computing system.

In one example, a server includes multiple processors that can all access a shared virtual or physical memory space. Although each processor may own separate cache lines, each processor has access to memory lines in the memory address space. A server or computing system generally includes one or more processors, memory, as well as other peripheral components and peripheral interfaces such as network interface cards (NICs), hardware accelerators, host bus adapters (HBAs), graphics accelerators, disks, etc. A processor can communicate with a variety of entities including an IP network.

According to various embodiments, cryptographic accelerators are included in a resource virtualization switch connected to multiple servers using a bus interface such as PCI Express or PCI-AS (PCI Advanced Switch). The bus interface provides a low latency, high bandwidth connection between the multiple servers and the cryptographic accelerators in the resource virtualization switch. The resource virtualization switch can be configured to aggregate several server memories into a unified memory or an aggregated memory address view to allow sharing of a cryptographic accelerator among several servers. For example, instead of writing to an address space associated with a local component, the data is written into the global address space associated with the resource virtualization switch.

FIG. 1 is a diagrammatic representation showing a typical implementation for connecting servers to an IP network. Server 101 includes a processor 103, memory 105, a cryptographic accelerator 107, and NIC 109. The processor 103 communicates with other components and interfaces in the system using an I/O bus and associated I/O controllers. One or more bus bridges may also be used. In typical implementations, communications between components and interfaces in server 101 occur over an I/O bus such as PCI. Server 111 includes processor 113, cryptographic accelerator 117, memory 115, and NIC 119. Communication within server 111 similarly occurs over one or more I/O buses. Server 121 includes a processor 123, memory 125, and NIC 129. In order to allow communication with an IP network through a local area network 161 and through network router 141, NICs 109, 119, and 129 are provided. In one example, a processor 103 passes data to a cryptographic accelerator 117 to encrypt data prior to transmitting the data onto the local area network 161. Similarly, data received from a NIC 109 is passed to a cryptographic accelerator 117 for decryption when data is received by the processor 103.

The various NICs 107, 119, and 129 are also associated with IP addresses and media access control (MAC) addresses. Each server and associated NIC encapsulates data into IP packets for transmission to a network router 141. Encapsulation may involve adding appropriate Telnet Control Protocol (TCP) and IP headers and addresses. Each NIC is also configured to remove TCP/IP headers and addresses and provide data to an associated processor over a system bus when IP packets are received from an IP network. Although only NICs are noted, each server 101, 111, and 121 may also include other components such as host bus adapters (HBAs).

A local area network 161 is typically an Ethernet based network. Ethernet is a broadcast medium, and any data transmitted on to the local area network 161 can be accessed by server 101, 111, or 121. Consequently, servers, particularly servers with sensitive information such as medical or financial information, typically have to use cryptographic accelerator accelerators or perform processing intensive software based cryptographic routines.

However, cryptographic accelerators can be expensive, and providing cryptographic accelerators and failsafe mechanisms for the accelerators on numerous servers is expensive. In some conventional mechanisms, the cryptographic accelerators are moved onto network devices.

Figure 2:
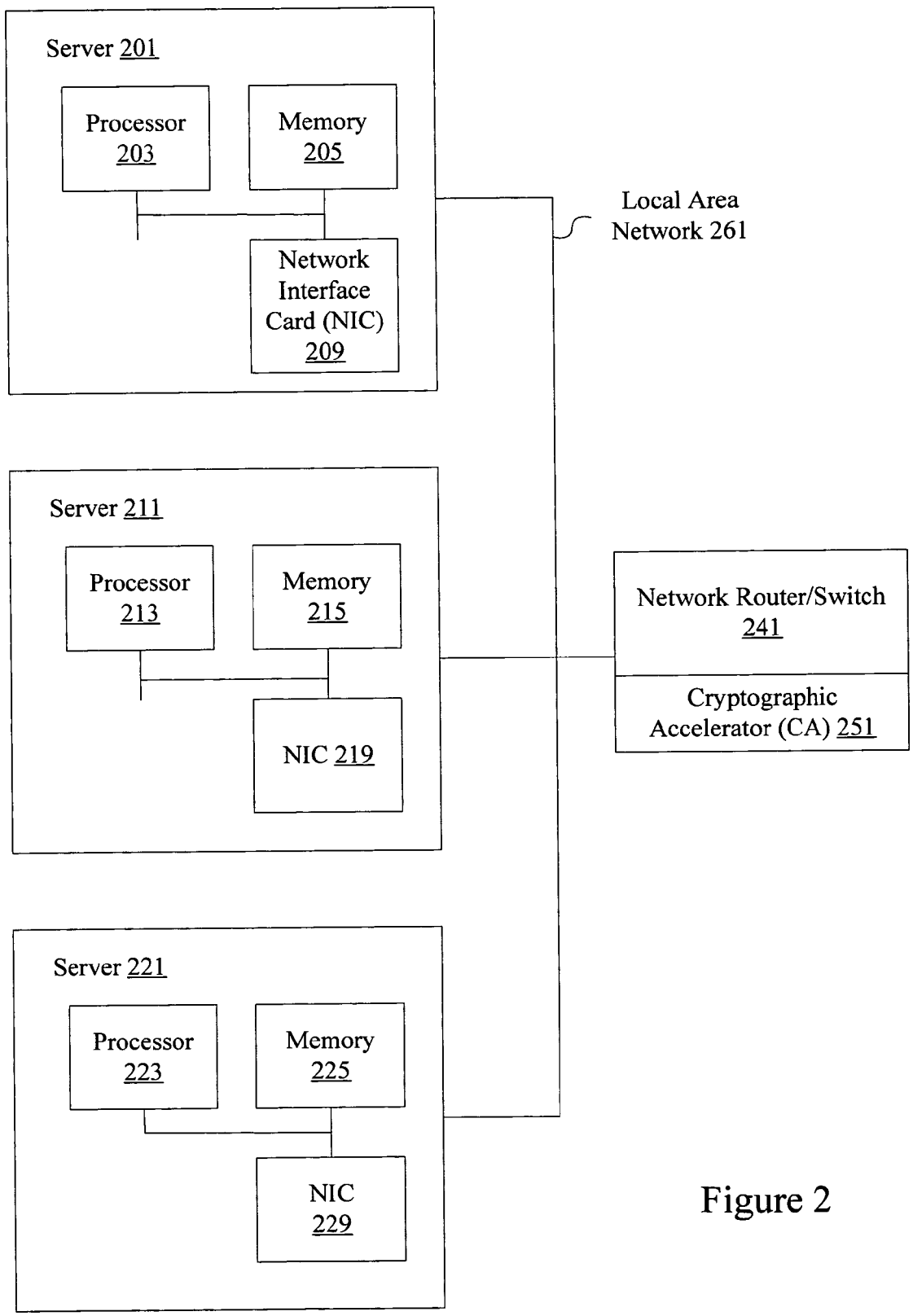
FIG. 2 is a diagrammatic representation showing cryptographic accelerators included in network routers.

FIG. 2 is a diagrammatic representation showing a typical implementation for connecting servers to an IP network having cryptographic devices. Server 201 includes a processor 203, memory 205, and NIC 209. Server 211 includes processor 213, memory 215, and NIC 219. Server 221 includes a processor 223, memory 225, and NIC 229. In order to allow communication with an IP network through a local area network 261 and through network router 241, NICs 209, 219, and 229 are provided. In order to provide some network security, a cryptographic accelerator 251 is provided typically with an edge router 241. The cryptographic accelerator 251 can be provided as a chip, a card, or a stand alone appliance. In one example, a processor 203 passes data onto a local area network 261 in plaintext or unencrypted form. When the data is received at the cryptographic accelerator 251, the data is cryptographically processed and passed to the network router 241 for forwarding. When encrypted data is received at the network router 241, the data is passed to the cryptographic accelerator 251 for decryption processing before sending the data onto a local area network 261.

A local area network 261 is typically an Ethernet based network. Ethernet is a broadcast medium, and any data transmitted on to the local area network 261 can be snooped by any server 201, 211, or 221. Typical techniques for using cryptographic accelerators are expensive, burdensome, and inadequate. Consequently, the techniques of the present invention contemplate providing cryptographic accelerators on a resource virtualization switch that is connected to multiple servers over a nonbroadcast fabric such as PCI Express. The servers can be configured to share cryptographic accelerator resources.

Figure 3:
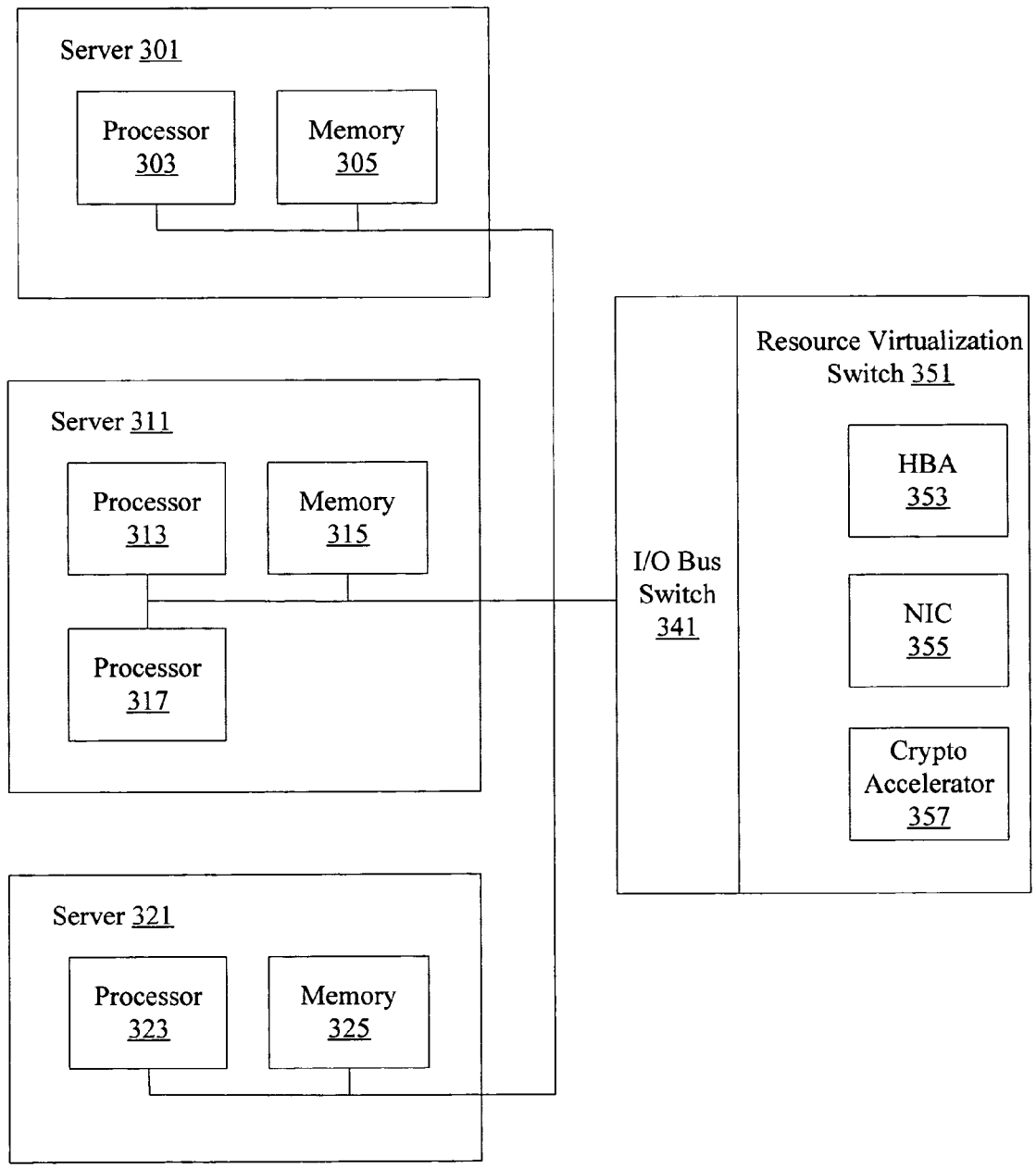
FIG. 3 is a diagrammatic representation showing a resource virtualization switch.

FIG. 3 is a diagrammatic representation showing separate servers connected to a resource virtualization switch 351. Server 301 includes processor 303 and memory 305. Server 311 includes processor 313 and 317 and memory 315. Server 321 includes only processor 323 and memory 325. Components and peripherals in each server 301, 311, and 321 are connected using one or more I/O buses. It should be noted that a server can be a virtual server such as a guest operating system, an application, or a virtual machine. According to various embodiments, the I/O bus is extended to allow interconnection with other servers and external entities through an I/O bus interconnect such as an I/O bus switch 341. In one example, server 301 no longer uses addresses such as port world wide names (pwwns) associated with an HBA or media access control (MAC) addresses associated with a NIC to communicate with other servers and external networks, but each server is instead configured communicate with a resource virtualization switch 351 using an I/O bus switch 341.

An I/O bus switch 341 may be a standalone entity, integrated within a particular server, or provided with a resource virtualization switch 351. According to various embodiments, components such as HBA 353, NIC 355, and a cryptographic accelerator 357, can be offloaded from servers 301, 311, and 321 onto a resource virtualization switch 351. The resources including HBA 343, NIC 345, and the cryptographic accelerator are maintained in a shared and virtualized manner on a resource virtualization switch 351. Links can be provided between the resource virtualization switch and external switches such as a network switch.

According to various embodiments, a series of servers is connected to the resource virtualization switch using a PCI Express bus architecture. In some cases, a PCI Express bridge is used to increase compatibility with some existing systems. However, a PCI Express bridge is not necessarily needed. By using a resource virtualization switch, the number of resources and links can be significantly reduced while increasing allocation efficiency. To perform cryptographic operations associated with sending or receiving data, a server 301 passes data to the resource virtualization switch cryptographic accelerator 357 as though the resource virtualization switch cryptographic accelerator 357 were included in the server 301.

Figure 4:
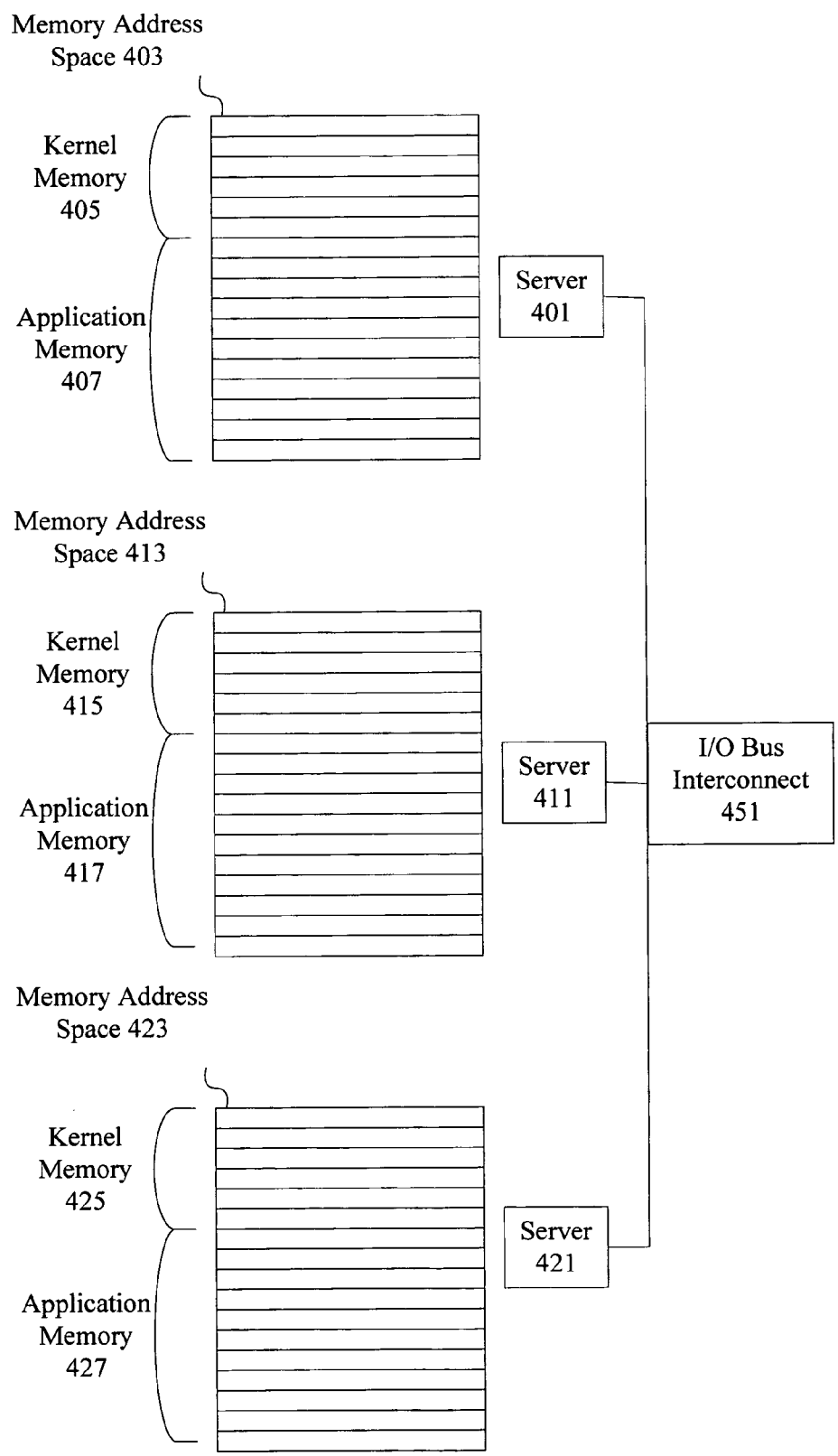
FIG. 4 is a diagrammatic representation depicting servers having separate memory address spaces.

FIG. 4 is a diagrammatic representation showing separate servers each associated with a memory address space. According to various embodiments, server 401 includes a memory address space 403 with kernel memory 405 and application memory 407. The memory address space 403 may be a physical memory address space or a virtual memory address space. Server 401 may include one or more processors with access to the memory address space. Server 411 includes a memory address space 413 with kernel memory 415 and application memory 417. The memory address space 413 may be a physical memory address space or a virtual memory address space. Server 411 may include one or more processors with access to the memory address space. Server 421 includes a memory address space 423 with kernel memory 425 and application memory 427. The memory address space 423 may be a physical memory address space or a virtual memory address space. Server 421 may include one or more processors with access to the memory address space.

According to various embodiments, the separate servers 401, 411, and 421 are connected to a resource virtualization switch using an I/O bus. In one embodiment, an I/O bus interconnect 451 such as an I/O bus switch is used to connect the separate servers to external entities such as an IP network. The I/O bus interconnect 451 is associated with logic that allows aggregation of the memory address spaces 403, 413, and 423. Any logical address space that includes the memory address spaces of multiple computer systems or servers is referred to herein as an aggregated memory address space. In one embodiment, an aggregated memory address space is managed by virtualization logic associated with an I/O bus switch or by a resource virtualization switch.

When a transaction occurs in a memory address space 413, the resource virtualization switch can identify the transaction as a server 411 transaction. The memory address space regions can be used to classify traffic. For example, data received from a server 411 in memory address space 413 can be assigned a particular identifier for transmission onto an IP network. When a reply to the transmission is received from the IP network, the exchange identifier is used to determine which server the resource virtualization switch forwards the reply to. In one example, a table listing server identifiers, memory address spaces, and source and destination address pairs is maintained by a resource virtualization switch. When a server writes a data block to a resource virtualization switch, an optional server identifier is assigned to IP packets for transmitting that data block. Reply messages with the same server identifier can then be appropriately forwarded to the originating server. It will be recognized that a variety of parameters other than server identifiers can be used to classify traffic.

It should also be noted that each server 401, 411, and 421 may be embodied in separate computer cases. In other examples, each server may be embodied in a card, a blade, or even a single integrated circuit (IC) device or portion of an IC device. Techniques for performing interconnection can be implemented on one or more application specific integrated circuits (ASICs) and/or programmable logic devices (PLDs). The entire interconnection mechanism can be provided on a server, a card, a chip, or on a processor itself.

Figure 5:
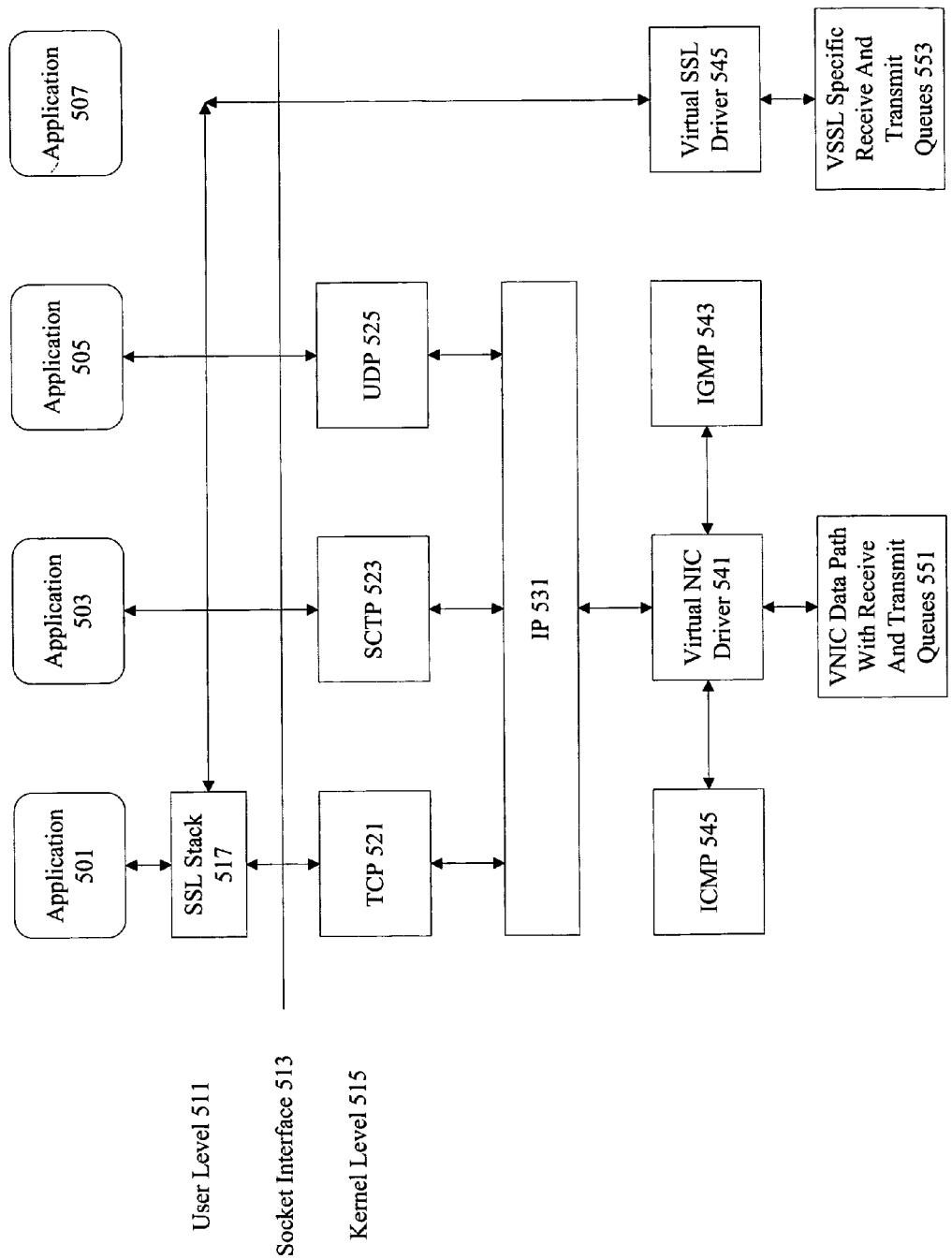
FIG. 5 is a diagrammatic representation showing a layer model using virtual NIC (VNIC) and a virtual SSL (VSSL) device driver.

FIG. 5 is a diagrammatic representation showing one example of a software architecture using the interconnection mechanisms of the present invention where a virtualized NIC is used for communication with external entities and a virtualized SSL accelerator is used for cryptographic processing. Although an SSL accelerator is being described, it will be recognized that a variety of cryptographic accelerators can be used. A user level 511 includes multiple applications 501, 503, 505, and 507. The user level 511 is coupled to a kernel level 515 through a socket interface 513. The socket interface 513 is associated with an SSL stack 517. Some examples of SSL stacks include OpenSSL and TurboSSL. According to various embodiments, the SSL stack 517 included no longer interfaces with an SSL driver but instead interfaces with an virtual SSL driver 545. In some embodiments, the SSL stack 517 works with both software cryptography and SSL accelerators simultaneously. The SSL stack 517 also includes functions that can be called by a processor server to determine if a virtualized SSL card is available to a particular application.

According to various embodiments, any application that uses an SSL service uses the SSL stack. In one embodiment, when an application that uses SSL initializes, the application determines if a virtualized SSL accelerator is available. If an accelerator is available and the server has access to that accelerator, SSL handshake and bulk encryption and decryption are off-loaded onto the accelerator. If no accelerator is accessible, then SSL processing is performed by the server processor without the benefit of dedicated hardware.

Also residing at the kernel level 515 are various transport layer protocols such as a transport control protocol (TCP) 521, user datagram protocol (UDP) 525, and Stream Control Transmission Protocol (SCTP) 523. In some examples, the transport layer protocols use the network layer Internet Protocol (IP) 531 associated with a device driver. However, the device driver is no longer a conventional device driver associated with a NIC or any other resource.

According to various embodiments, the NIC driver and the SSL driver are replaced with modified device drivers 541 and 545. The virtual NIC driver 541 may be associated with the Internet Control Message Protocol (ICMP) 545 and the Internet Group Management Protocol (IGMP) 543. Any device driver configured to drive a component on a resource virtualization switch is referred to herein as a modified or virtual device driver.

The modified or virtual device driver 541 or 545 is configured to allow kernel access to a virtual peripheral such as a virtual NIC or a virtual SSL accelerator. The kernel continues to operate as though it has access to a peripheral such as a NIC card or an SSL accelerator included in the server. That is, the kernel may continue to operate as though the NIC or SSL accelerator can be accessed directly over the bus without using a resource virtualization switch. Applications do not need to be modified to work with virtualized resources. The virtual device drivers supplied are actually driving operation of receive and transmit queues 551 and 553.

Applications may continue to use a conventional network technology such as TCP/IP and a virtual NIC driver can automatically modify data to allow transmission on an I/O bus such as PCI Express. Hardware accelerators such as SSL accelerators, eXtensible Markup Language (XML) accelerators, digital signal processors (DSPs), and graphics accelerators can be virtualized while allowing rapid and efficient access in a secure local bus environment. Mainframe access using KVM can be shared. Quality of service and traffic engineering can be applied at the bus level. Furthermore, resources can be flexibly provisioned and reconfigured. Multiple VNICs can be assigned to a single application to allow for path redundancy in the event that a single NIC fails.

FIG. 6A is a diagrammatic representation showing one example of a virtual NIC (VNIC) driver. Any mechanism allowing the mapping of multiple servers over an I/O bus to a single NIC device is referred to herein as a VNIC driver. When a conventional NIC card or device is connected to a computer system over a bus, a number of I/O bus parameters 613 are configured for that NIC. According to various embodiments, a VNIC driver 611 keeps the same set of I/O bus parameters 613 to allow a VNIC driver to operate in conventional systems. In one example, a processor in a server uses the same set of parameters and formats used for a NIC driver to operate a VNIC driver. According to various embodiments, both a NIC and a VNIC driver 611 use the same NIC parameters 613. Some configuration parameters that may be used include bus widths, physical addresses, descriptor ring sizes, and buffer thresholds.

In some embodiments, a NIC driver typically includes a send driver and a receive driver. A send driver initiates a transmission whenever the upper level software passes data to the driver. If the driver is unable to transmit the packet immediately, the supplied packet is queued in a transmit-pending buffer associated with a NIC. However, in an implementation using VNICs, the supplied packet is transmitted immediately over an I/O bus to a resource virtualization switch. In some instances, the resource virtualization switch queues the packet in a transmit-pending buffer or in a queue associated with the initiating server. After forwarding the packet, the send driver operates in conjunction with an interrupt service routing (ISR) and interrupts the processor to signal the end of transmission and indicate status to the processor.

A receive driver conventionally transfers data received from a network to the memory of the host. Typically, network data is received on a receive buffer ring associated with a NIC card and transferred to memory upon accessing an ISR. However, since a NIC is moved from a server onto a resource virtualization switch, the VNIC driver receives data directly from an I/O bus. The VNIC driver is interrupt driven and arbitrates for access to the I/O bus connecting the host to the resource virtualization switch. When access is available, the resource virtualization switch reads buffer rings or descriptor queues associated with a resource virtualization switch and transfers data into its own receive buffer ring. It can then proceed to interrupt the host processor to transfer data into host memory or directly transfer data into host memory and interrupt the host processor with status information when the transfer is complete.

FIG. 6B is a diagrammatic representation showing one example of a virtual SSL (VSSL) driver. Any mechanism allowing a server to access an SSL accelerator shared by multiple servers over an I/O bus is referred to herein as a VSSL driver. When a conventional SSL card or device is connected to a computer system over a bus, a number of I/O bus parameters 653 are configured for that SSL accelerator. According to various embodiments, a VSSL driver 651 keeps the same set of I/O bus parameters 653 to allow a VSSL driver to operate in conventional systems. In one example, a processor in a server uses the same set of parameters and formats used for a SSL driver to operate a VSSL driver. According to various embodiments, both a SSL and a VSSL driver 651 use the same SSL parameters 653. In typical embodiments, only one VSSL driver is included on each server. The VSSL driver 651 is capable of working with multiple physical SSL accelerators. For example, each VSSL driver 651 can operate with multiple sets of transmit and receive descriptor rings used to communicate with SSL accelerators.

Some adapter parameters 655 that the VSSL driver accesses include the location of the descriptor rings that it should use to access particular SSL accelerators. The driver 651 has SSL specific receive/transmit (Rx/Tx) descriptor queues or rings. Whenever an SSL record needs to be processed, it is placed by the VSSL driver 651 in the transmit queue. Responses from SSL card arrive in the receive queue. VSSL adapter parameters 655 include bus widths, physical addresses, descriptor ring sizes, and buffer thresholds.

The VSSL driver 651 accepts requests from SSL applications and the SSL stack. The VSSL driver 651 can also be configured to support redundant SSL accelerators. For example, a VSSL driver 651 may be provided with multiple sets of transmit and receive descriptor queues associated with different physical SSL accelerators. If a particular SSL accelerator fails, the VSSL driver 651 begins to use a backup SSL accelerator's transmit and receive descriptor queues.

The VSSL driver can also be configured to maintain statistics, such as the number of SSL connections per server and per application, the number of incoming and outgoing packets decrypted and encrypted per server and per application, total number of bytes decrypted and encrypted per server and per application, and number of errors per server and per application.

A VSSL driver can be configured as a send driver and a receive driver. A send driver initiates a transmission whenever the upper level software passes data to the driver. If the driver is unable to transmit the packet immediately, the supplied packet is queued in a transmit-pending buffer associated with a SSL. However, in an implementation using VSSLs, the supplied packet is transmitted immediately over an I/O bus to a resource virtualization switch. In some instances, the resource virtualization switch queues the packet in a transmit-pending buffer or in a queue associated with the initiating server. After forwarding the packet, the send driver operates in conjunction with an interrupt service routing (ISR) and interrupts the processor to signal the end of transmission and indicate status to the processor.

A receive driver conventionally transfers data received to the memory of the host. The VSSL driver receives data directly from an I/O bus. The VSSL driver is interrupt driven and arbitrates for access to the I/O bus connecting the host to the resource virtualization switch. When access is available, the resource virtualization switch reads buffer rings or descriptor queues associated with a resource virtualization switch and transfers data into its own receive buffer ring. It can then proceed to interrupt the host processor to transfer data into host memory or directly transfer data into host memory and interrupt the host processor with status information when the transfer is complete.

Figure 7:
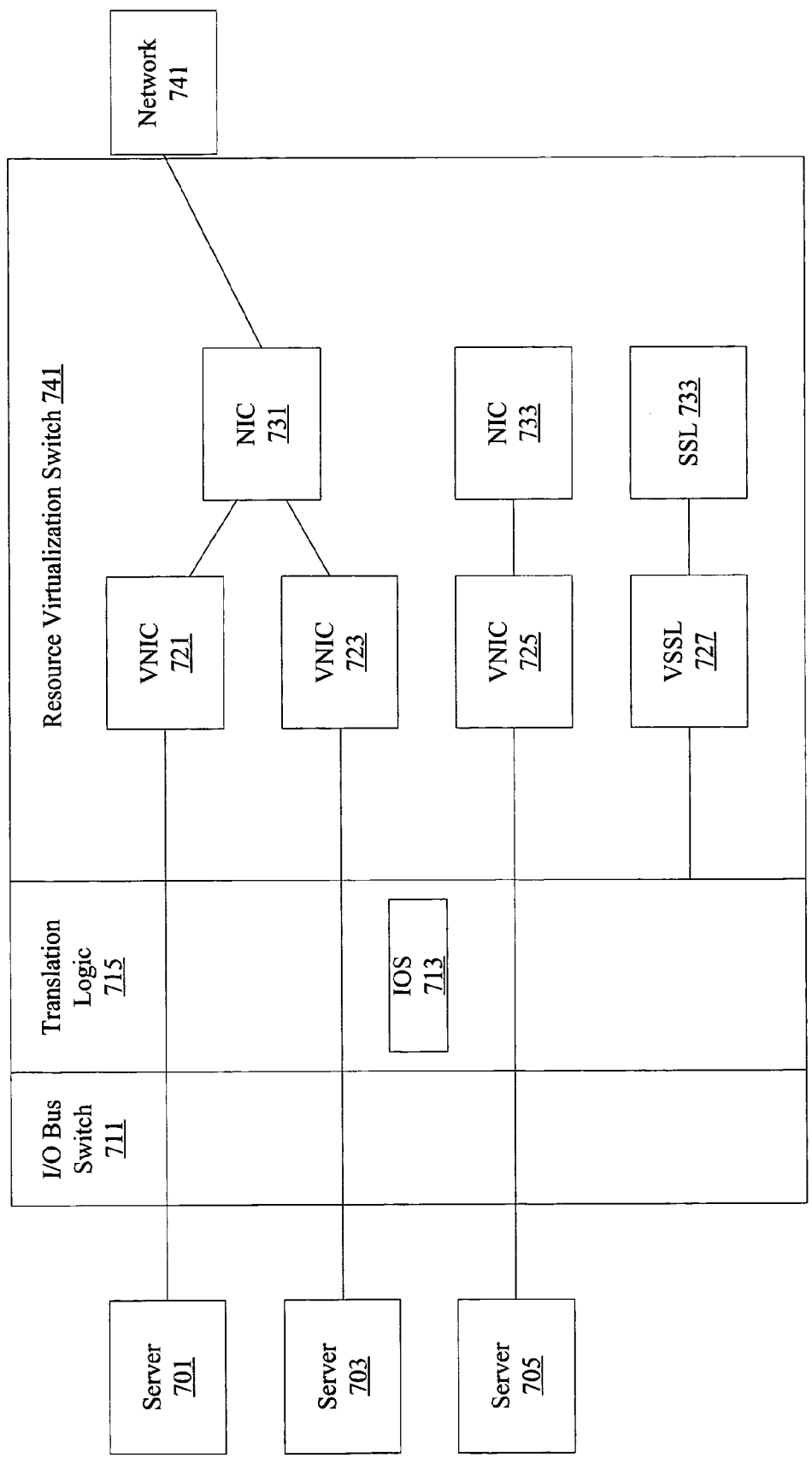
FIG. 7 is a diagrammatic representation showing a resource virtualization switch platform.

FIG. 7 is a diagrammatic representation showing multiple servers mapped to shared resource virtualization switch resources. According to various embodiments, servers 701, 703, and 705 are connected to VNICs 721, 723, and 725 and VSSL 727. In some embodiments, each VNIC and VSSL is associated with a buffer ring or descriptor ring that servers access in order to write data to the resource virtualization switch. For example, the buffer/descriptor ring may include read queues, write queues, and control queues which may not necessarily hold the data itself, but may be used to hold descriptors identifying or referencing the data in memory. Descriptors are used in a number of conventional I/O controller applications.

Consequently, when a server is writing to a VNIC or VSSL, the server will write descriptors into the buffer/descriptor ring of corresponding VNIC or VSSL. In one example, virtual NICs 721 and 723 are coupled to NIC 731. VNICs 721 and 723 each have buffer/descriptor rings accessible by servers bound to those particular VNICs. Similarly, servers may be bound to VNIC 725 and VSSL 727. VNICs and VSSLs are also referred to herein as a V chip, virtualization logic, or virtualization circuitry. According to various embodiments, server to virtualization logic communication traffic is switched by a PCI Express fabric. Each server has a memory window programmed to communicate with other servers and virtualization logic. Virtualization logic is mapped in a combined address map associated with all servers. Virtualization logic pulls data from server memory. In some embodiments, the base address and number of descriptor entries are programmed in virtualization logic. For example, a particular VNIC 721 may have base address and descriptor information associated with a particular server. Virtualization logic polls the descriptor ring to find whether any packet is ready to be transmitted. Using bus arbitration mechanisms, virtualization logic can read data associated with the descriptor and forward the information to NIC 731.

Similarly for receive traffic, virtualization logic prefetches descriptors and keeps the buffers, so when virtualization logic receives packets for a particular server, it writes the pre-fetched buffer address and at the end of the write, it assigns the ownership bit to the server processor. The server processor can then read the buffer address and obtain the receive data. In one example, a VNIC chip has 4 ports connected to four separate servers over a PCI Express bus. Each VNIC chip can be coupled to separate conventionally available NICs or can have NIC functionality integrated within each chip.

When a data sequence is received from a server 701, information identifying the server associated with the data sequence is mapped with server 701 and maintained in a database. According to various embodiments, the servers and VNICs and VSSLs communicate using bus arbitration mechanisms available on a PCI Express bus. NICs 731 and 733 communicate with external network entities in the same manner conventional NICs communicate.

VNICs 721, 723, and 725 and VSSL 727 are coupled to servers 701, 703, and 705 through an I/O bus switch 711 and translation logic 715. According to various embodiments, translation logic is used to split PCI Express (10 Gbps) in two 5 Gbps I/O slots each with a SPI-3 interface to support 4 Gbps throughput. The translation logic terminates a PCI Express protocol from the I/O bus and tunnels PCI Express read/write requests over SPI-3 to and from VNICs and VSSLs. Interrupt messages generated are routed from I/O adaptors to translation logic 715 and sent to appropriate servers. Translation logic 715 also provides path to I/O switch chip that switches traffic between different 10 adaptors.

The translation logic 715 provides switching capability between multiple I/O adaptors by tunneling SPI-3 packets through PCI Express. The translation logic 715 can also be used to implement in I/O switch or implement a DMA engine. An I/O switch (IOS) 713 can also be provided to allow switching between I/O adapters or resources. According to various embodiments, I/O adapters communicate with each other through translation logic 715 and an associated I/O switch 713. The I/O switch provides a pipe between I/O adapters and resources.

Figure 8:
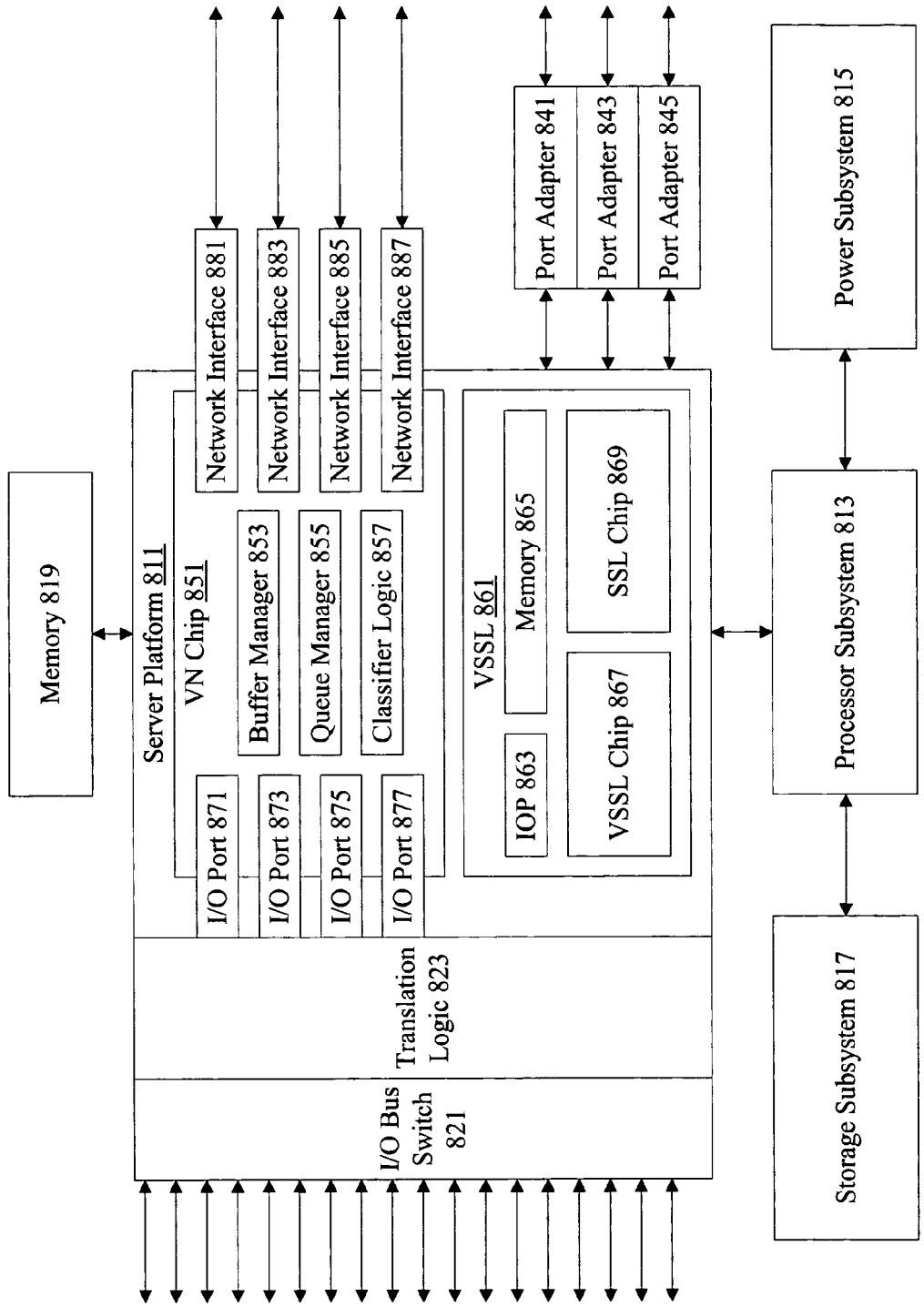
FIG. 8 is a diagrammatic representation showing a resource virtualization switch platform with VNIC and VSSL resources.

FIG. 8 is a diagrammatic representation showing one example of a resource virtualization switch with a VSSL card. An I/O bus switch 821 is connected to multiple computer systems using an I/O bus such as a PCI Express bus and translation logic 823. Port adapters 841-845 are associated with multiple resources such as HBAs, sATAs, hardware accelerators, etc. According to various embodiments, a VNIC chip or VN chip 851 has integrated virtualization logic and port adapters in network interfaces 881-887. A VSSL card 861 also has integrated virtualization logic included in VSSL chip 867 as well as an SSL accelerator 869. The network interfaces 881-887 may be MAC interfaces associated with multiple gigabyte ports. According to various embodiments, network interfaces 881-887 include logic mechanisms conventionally found in a NIC. The server platform 811 manages interaction between the servers connected to the I/O bus switch 821 and various resources associated with the port adapters 841-845 and network interfaces 881-887.

The server platform 811 is associated with memory 819 and a processor subsystem 813, a power subsystem 815, and a storage subsystem 817. In some embodiments, the server platform 811 includes tables with information mapping various servers connected through the I/O bus switch 821 and various port adapter resources and network interfaces. The processor subsystem 813 is configured to manage port adapter resource as though the port adapters and network interfaces 881-887 were included in individual servers. In one example, the processor subsystem 813 is configured to initialize an IP network connection regardless of whether servers have been connected to the server platform 811.

According to various embodiments, the I/O bus switch 821 supports flexible virtual channel configuration, high availability, and dynamic port configurations. Examples of I/O bus switches include the PCI Express switch PEX 8532 available from PLX Technology, Inc. of Sunnyvale, Calif. and the PCI Express switch PES-48G available from IMC Semiconductor of Agoura Hills, Calif.

A VSSL card 861 is coupled to translation logic 823 and the I/O bus switch 821. According to various embodiments a VSSL card 861 is separate from a VNIC or VN chip or card 851. The VSSL card includes a VSSL chip 867. In some embodiments, the VSSL chip 867 polls transmit and receive queues associated with various servers. When it sees a packet in a server transmit queue, it pulls the packet and forwards associated commands to an SSL chip 869. SSL chip 869 can be one of a number of available SSL accelerators, such as the Nitrox Chip available from Cavium Networks of Mountain View, Calif. It should be noted that although a VSSL card 861 and a VN chip 851 are shown, virtualization logic and accelerator functionality can also be implemented in a single chip. Alternatively, a VN chip 851 may be separated out into multiple components and implemented as a card. In still other implementations, all virtualization logic for the VN chip 851, the VSSL card 861, and any other components is implemented in a single device. In one embodiment, an SSL chip 869 includes general purpose processor cores and specialized cryptography cores included on a single ASIC. The cryptography cores may include SSL cores, IP Security (IPSec) cores, SSL-VPN cores, XML/web services cryptography cores, storage and fibre channel data cryptography cores, and email data cryptography cores.

IOP 863 is configured to perform context management for SSL chip 869. According to various embodiments, an SSL agent runs on IOP 863. The SSL agent manages and allocates key memory and context memory. A context is used for each SSL connection. A context is allocated before a new SSL connection is established. According to various embodiments, context can be established in several manners.

A server can send a context allocation request to the SSL transmit queue. The VSSL chip 867 pulls this request and notifies the SSL agent running on IOP 863. The SSL agent allocates a new context and passes an index back to the VSSL chip 867. The VSSL chip 867 sends the response back to the server's receive queue. An application will now have a context allocated for it and the context can be passed in for all SSL requests.

Alternatively, an SSL agent could allocate a pool of contexts per server. Whenever an application needs a new context, it could get the context locally from the VSSL driver (which keeps a cache of the contexts). Once the VSSL driver's cache runs out of contexts, it sends a request to the SSL Agent to obtain additional contexts.

According to various embodiments, a VNIC chip or VN chip 851 is also coupled to the I/O Bus switch 821 through optional translation logic 823. The VN chip 851 has I/O ports 871-877 such as PCI Express interfaces coupled to the I/O bus switch 821. The VN chip 851 also has a connection with the processor subsystem 813 and a series of network interfaces 881-887 connecting the VN chip 851 to external network entities. In other examples, the VN chip may not include NIC interfaces and instead may be connected to conventional NICs.

The VNIC chip includes classifier logic 847, a queue manager 845, and a buffer manager 843. According to various embodiments, the classifier logic 847 includes parse and lookup logic configured to identify information such as a packet destination server and priority. Classifier logic can also be used to filter incoming data or apply traffic policing policies. In some instances, classifier logic can be used to block packets in order to implement a firewall. In one embodiment, classifier logic 847 parses a packet and uses the information in the packet to identify entries in lookup tables. The data is then buffered. Buffer manager 843 manages data in memory associated with the VN chip 851. Queue manager 845 manages descriptors for data posted. A descriptor can include a reference to a memory location, a length, a source port, and a multicast count, as well as other parameters.

In one example, classifier logic 847 determines that the packet received is a high priority packet and should be placed in a high priority queue by the buffer manager 843. Parameters provided may include a pointer, a length, a source port, a multicast count, and a queue identifier. The data is then placed into memory and information referencing the data such as a pointer and a length is posted into a buffer ring or a descriptor ring. When a connected server successfully arbitrates for bus access, the server reads the buffer ring or descriptor ring and obtains the data from memory associated with the VN chip. According to various embodiments, the server reads the data directly into its own memory.

Each individual server may also include descriptor queues. As will be appreciated, the servers connected to the I/O Bus Switch and the resource virtualization switch arbitrate for access to the I/O Bus. When access is obtained, data can be read from memory associated with one of the server based on the information provided in the descriptor queues.

Redundancy mechanisms are also provided to allow continued operation in the event that a NIC or other resource fails or a resource virtualization switch itself fails. Redundancy mechanisms can be managed by a VNIC device or VN chip, a resource virtualization switch, or by the individual servers themselves.

Figure 9:
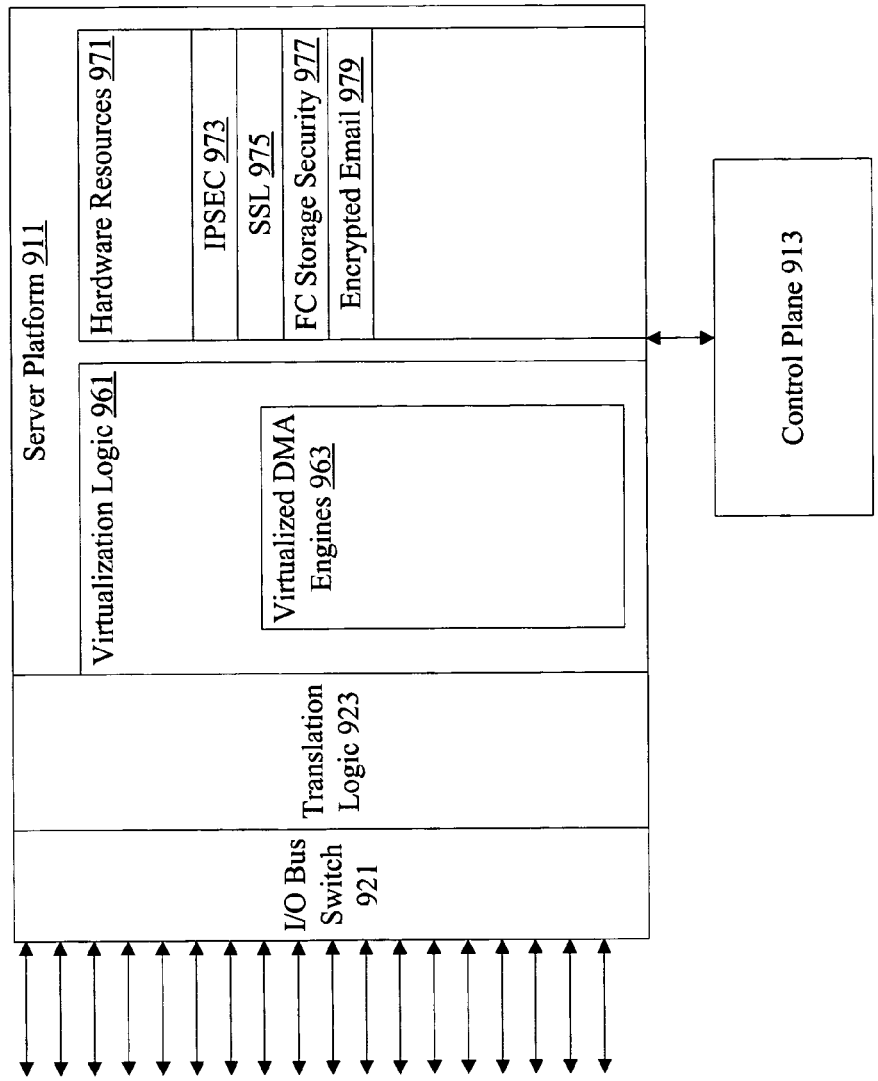
FIG. 9 is a diagrammatic representation showing a resource virtualization switch platform with virtualized DMA engines.

FIG. 9 is a diagrammatic representation depicting an embodiment of a resource virtualization switch using virtual Direct Memory Access (DMA) engines. According to various embodiments, a virtual DMA engine and a particular cryptographic core is assigned to each application, guest operating system, system image, virtual server, or physical server to provide true hardware accelerated security services on demand.

An I/O bus switch 921 is connected to multiple computer systems using an I/O bus such as a PCI Express bus and translation logic 923. Virtualization logic 961 obtains data such as descriptor data from individual servers and provides the data to hardware resources 971. In some examples, data transfer is performed using virtualized Direct Memory Access (DMA) mechanisms to allow minimal processor involvement during data transfers. In some embodiments, a descriptor is provided on a descriptor queue. The descriptor includes addresses, lengths, and other data parameters. A virtualized DMA engine 963 in virtualization logic 961 reads the descriptor and arbitrates for I/O bus access as needed, and directly transfers the block of data in memory to an appropriate hardware resource 971. In some embodiments, the hardware resources 971 include cryptography accelerators with cores specifically configured for processing Secure Socket Layer SSL 975, IP Security (IPSec) 973, storage and fibre channel data 977, and email data 979.

Figure 10:
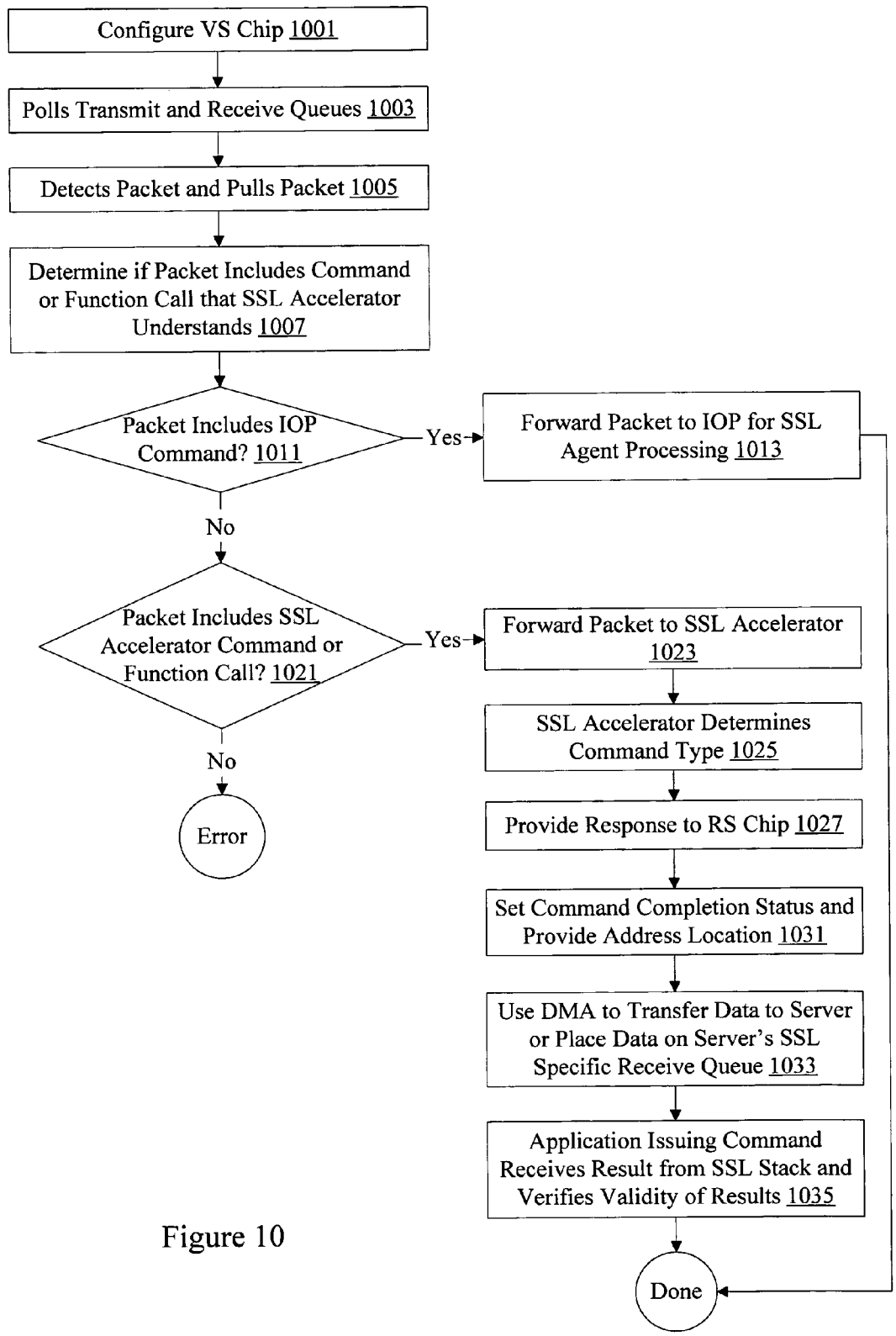
FIG. 10 is a flow process diagram depicting data path processing.

FIG. 10 is a flow process diagram depicting virtual SSL chip processing. At 1001, a virtual SSL chip (VS chip) associated with a physical SSL accelerator is configured to poll transmit and receive queues associated with particular servers. At 1003, polls transmit and receive queues. At 1005, detects a packet on a transmit queue and pulls the packet. According to various embodiments, the VS chip determines at 1007 if the packet includes a command or function call that the SSL accelerator understands. If the packet includes an IOP command at 1011, the packet is forwarded to an IOP at 1013 for SSL agent processing. Otherwise, it is determined if the packet includes an SSL accelerator command at 1021. If the packet includes an SSL accelerator command or function call, the packet is forwarded to the SSL accelerator at 1023.

The SSL accelerator determines the command type at 1025. According to various embodiments, the command type may be RSA handshake, bulk encryption, or bulk decryption related. When the command or function processing is complete, a response is provided to the VS chip at 1027. The SSL accelerator also sets the command completion status and provides an address location at 1031. The VS chip detects that the command is complete, and takes the results and uses either DMA to transfer the data to the server or places the data on the server's SSL specific receive queue at 1033. The application issuing the command gets the result from the SSL stack and verifies that the results look valid at 1035.

Although a particular process flow is described, it should be noted that alternatives are also possible. In one example, a cryptographic accelerator can also operate in proxy mode. Instead of sending data over a bus several times, data is inspected at a virtual network interface card using deep packet inspection. The data is then sent to an SSL engine. In one example, the SSL engine terminates a TCP connection, decrypts the traffic, opens a new HTTP or HTTPS connection in clear text to a server, and sends data in clear text in a secured and protected zone.

In addition, although exemplary techniques and devices are described, the above-described embodiments may be implemented in a variety of manners, media, and mechanisms. For instance, instructions and data for implementing the above-described invention may be stored on a disk drive, a hard drive, a floppy disk, a server computer, or a remotely networked computer. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

What is claimed is:

1. A system, comprising:
    a first server including a first processor and a first memory address space;
    a second server including a second processor and a second memory address space;
    a switch including a cryptographic accelerator, the switch connected to the first server and the second server using an input/output bus interface, wherein the first server accesses the cryptographic accelerator by using a first virtual device driver and the second server accesses the cryptographic accelerator by using a second virtual device driver, wherein the switch is a resource virtualization switch coupled to an external network.

2. The system of claim 1, wherein the first virtual device driver is associated with descriptor queues including transmit and receive descriptor queues.

3. The system of claim 2, wherein virtualization logic associated with the switch polls the descriptor queues associated with the first virtual device driver to obtain data for cryptographic processing.

4. The system of claim 3, wherein virtualization logic writes data to the descriptor queues associated with the first virtual device driver associated with the first virtual device driver when cryptographic processing is complete.

5. The system of claim 1, wherein the resource virtualization switch is coupled to the external network through a plurality of network interface cards.

6. The system of claim 5, wherein the first server and the second server use the cryptographic accelerator to encrypt packets transmitted onto the external network.

7. The system of claim 5, wherein the first server and the second server use the cryptographic accelerator to decrypt and authenticate packets received from the external network.

8. The system of claim 1, wherein the cryptographic accelerator is a Secure Socket Layer (SSL) accelerator.

9. The system of claim 1, wherein the first and second virtual device drivers are virtual cryptographic accelerator device drivers.

10. The system of claim 1, wherein the input/output but interface is a PCI Express interface.

11. The system of claim 1, wherein an application associated with the first server accesses the cryptographic accelerator as though the cryptographic accelerator were included in the first server.

12. The system of claim 1, wherein the first address space and the second address space are distinct address spaces.

13. A resource virtualization switch, comprising:
    an I/O bus interface connected to a plurality of servers, each of the plurality of servers comprising a processor and memory;
    a plurality of hardware resources, including cryptographic accelerator resources; and
    virtualization logic including virtualized Direct Memory Access (DMA) engines configured to obtain data from the plurality of servers and provide the data to selected hardware resources.

14. The resource virtualization switch of claim 13, the cryptographic accelerator resources including a Secure Socket Layer (SSL) core and an IP Security (IPsec) core.

15. The resource virtualization switch of claim 13, the cryptographic accelerator resources including a fibre channel and storage security core and an email encryption core.

16. The resource virtualization switch of claim 13, the cryptographic accelerator resources including an XML/web services cryptographic core and a Secure Socket Layer Virtual Private Network core.

17. The resource virtualization switch of claim 13, wherein the plurality of hardware resources further include network interface cards (NICs).

18. The resource virtualization switch of claim 17, wherein the plurality of hardware resources further include host bus adapters (HBAs).

19. The resource virtualization switch of claim 13, wherein a plurality of applications running on the plurality of servers are mapped to individual hardware resources.

20. The resource virtualization switch of claim 13, wherein a plurality of applications running on the plurality of servers are mapped to individual cryptographic accelerator cores.

21. The resource virtualization switch of claim 13, wherein the resource virtualization switch further comprises translation logic.

22. The resource virtualization switch of claim 13, wherein the resource virtualization switch further comprises a control plane, including a control plane processor and memory.

23. A method for encrypting data, the method comprising:
    polling for a transmit descriptor on a transmit descriptor queue associated with a first server virtual cryptographic accelerator device driver, the transmit descriptor corresponding to unencrypted data from a first server;
    reading unencrypted data by using information from the transmit descriptor after arbitrating for access to an I/O bus;
    providing unencrypted data to a cryptographic accelerator included in a resource virtualization switch;
    obtaining encrypted data from the cryptographic accelerator;
    inserting a receive descriptor onto a receive descriptor queue associated with the first server virtual cryptographic accelerator device driver, the receive descriptor corresponding to encrypted data requested by the first server.

24. The method of claim 23, wherein the I/O bus is a PCI Express fabric.

25. The method of claim 24, wherein the I/O bus is a PCI Advanced Switching (PCI-AS) fabric.

26. The method of claim 24, wherein the cryptographic accelerator comprises a general purpose processor core and specialized cryptographic cores.

27. The method of claim 24, wherein the cryptographic cores are Secure Socket Layer (SSL) cores.

28. The method of claim 24, wherein individual virtualized Direct Memory Access (DMA) engines are assigned to individual applications.

29. The method of claim 24, wherein individual virtualized Direct Memory Access (DMA) engines are assigned to individual servers.

30. The method of claim 24, wherein individual virtualized Direct Memory Access (DMA) engines are assigned to individual entities consisting of guest operating systems, system images, virtual servers, physical servers, and applications.

31. A system for encrypting data, the system comprising:
- means for polling for a transmit descriptor on a transmit descriptor queue associated with a first server virtual cryptographic accelerator device driver, the transmit descriptor corresponding to unencrypted data from a first server;
- means for reading unencrypted data by using information from the transmit descriptor after arbitrating for access to an I/O bus;
- means for providing unencrypted data to a cryptographic accelerator included in a resource virtualization switch;
- means for obtaining encrypted data from the cryptographic accelerator;
- means for inserting a receive descriptor onto a receive descriptor queue associated with the first server virtual cryptographic accelerator device driver, the receive descriptor corresponding to encrypted data requested by the first server.

32. A method for decrypting data, the method comprising:
- receiving encrypted packet data at a resource virtualization switch;
- inspecting the encrypted packet data at a network interface card associated with the resource virtualization switch;
- passing the encrypted packet data to a cryptographic accelerator included in the resource virtualization switch;
- decrypting the encrypted packet data;
- forwarding the decrypted packet data to a server over an I/O bus interface.

33. The method of claim 32, wherein encrypted packet data is HTTPS data.

34. The method of claim 33, wherein a new HTTPS connection is opened with the server before sending the decrypted packet data to the server.

* * * * *

UNITED STATES PATENT AND TRADEMARK OFFICE
CERTIFICATE OF CORRECTION

PATENT NO. : 7,634,650 B1
APPLICATION NO. : 11/184306
DATED : December 15, 2009
INVENTOR(S) : Shah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Ninth Day of November, 2010

David J. Kappos
*Director of the United States Patent and Trademark Office*